United States Patent
Skog

(10) Patent No.: US 8,094,648 B2
(45) Date of Patent: Jan. 10, 2012

(54) METHOD AND SYSTEM FOR MOBILE-TO-MOBILE WEB SERVICE HANDLING

(75) Inventor: Robert Skog, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1281 days.

(21) Appl. No.: 10/598,676

(22) PCT Filed: Mar. 1, 2005

(86) PCT No.: PCT/SE2005/000298
§ 371 (c)(1),
(2), (4) Date: Sep. 7, 2006

(87) PCT Pub. No.: WO2005/086458
PCT Pub. Date: Sep. 15, 2005

(65) Prior Publication Data
US 2007/0213039 A1    Sep. 13, 2007

(30) Foreign Application Priority Data
Mar. 9, 2004 (SE) .................................... 0400593

(51) Int. Cl.
*H04L 12/66* (2006.01)
(52) U.S. Cl. ....... 370/352; 370/313; 370/338; 455/41.1; 455/41.2
(58) Field of Classification Search ............ 370/338, 370/313, 352; 455/41.2, 41.3
See application file for complete search history.

(56) References Cited

U.S. PATENT DOCUMENTS

| | | | |
|---|---|---|---|
| 6,816,724 B1 * | 11/2004 | Asikainen | 455/414.1 |
| 7,016,334 B2 * | 3/2006 | Cohen et al. | 370/338 |
| 7,349,543 B2 * | 3/2008 | Simpson et al. | 380/270 |
| 7,526,252 B2 * | 4/2009 | Rekimoto et al. | 455/41.2 |
| 2001/0039592 A1 * | 11/2001 | Carden | 709/245 |
| 2005/0141491 A1 * | 6/2005 | Low et al. | 370/352 |
| 2005/0163105 A1 * | 7/2005 | Naick et al. | 370/352 |
| 2006/0031515 A1 * | 2/2006 | Van Gassel et al. | 709/227 |
| 2006/0098621 A1 * | 5/2006 | Plata Andres et al. | 370/352 |
| 2006/0146746 A1 * | 7/2006 | Kim | 370/328 |

FOREIGN PATENT DOCUMENTS

| | | |
|---|---|---|
| EP | 1253766 A2 | 10/2002 |
| EP | 1328882 B1 | 4/2008 |
| JP | 2004-021420 | 1/2004 |
| WO | WO 9847303 A2 | 10/1998 |
| WO | WO 02058360 A2 | 7/2002 |

\* cited by examiner

*Primary Examiner* — Kamran Afshar
*Assistant Examiner* — Allahyar Kasraian

(57) ABSTRACT

A method for web service handling in peer-to-peer communication is provided. A web service (412-1) associated with a web service identity e.g. a URI is arranged in a first mobile node (410). Unique identification information is formed by combining the web service identity with a unique circuit switched identifier of the mobile node, such as the E.164 number. The unique identification information is transmitted to a registration unit (440) and registered together with location information that enables for other mobile nodes (420) to find the web service. The location information may for example comprise the current IP address of the first mobile node and the port number for the web service at this node, or relate to an intermediate device used to reach the web service at the first mobile node.

25 Claims, 5 Drawing Sheets

METHOD AND SYSTEM FOR MOBILE-TO-MOBILE WEB SERVICE HANDLING

TECHNICAL FIELD

The present invention relates to web service access and peer-to-peer communication.

BACKGROUND

Web service (WS) technologies have recently attracted an explosive interest and are sometimes said to be revolutionizing the packet-based communication networks. A web service is basically a network accessible interface to application functionality implemented through standard Internet technologies. By means of web services, one piece of software can access objects and methods from another piece of software irrespective of long distances and intermediate firewalls, which allows for distributed software systems.

Three ways have been proposed for introducing web services in mobile networks. These architectures will gradually be introduced in the network and in due time all three may co-exist. In a first WS scenario, the user accesses the application through a web page in the browser. The application is located on a web server and interacts with web services to prepare the response back to the browser. Many of today's enablers (location, charging, etc.) will introduce web services in this manner. Secondly, there can be direct access to web services from the mobile device. In this case, a web service enabled application in the mobile device communicates directly with web services on the web. Finally, in a third scenario, the web services are located at mobile devices. A mobile device requests a web service located at another mobile device. The web service utilization then relies on peer-to-peer connections and this is the scenario addressed herein.

Connectivity between mobile devices can be achieved in different ways. One way would be to have full IP connectivity in the mobile network, but due to security and payment considerations this would not be feasible. Also, in IPv4, the number of public addresses would not be enough. The normal way to achieve peer-2-peer connections is instead to introduce an overlay network, such as the IP Multimedia Subsystem (IMS). IMS provides IP services independent of applications and platforms.

IMS uses the Session Initiation Protocol (SIP) as session control mechanism. SIP is indifferent to media and defines how a connection should be handled irrespective of whether the content is voice, video, data or web-based. By means of SIP, mobile devices can be registered and peer-to-peer connections initiated. A conventional registration via IMS/SIP is a registration of the SIP client of the mobile device. All SIP messages to a particular end user are (via the IMS infrastructure) sent to the SIP client in the user device.

Prior-art solutions like the above IMS/SIP registration are not very well suited for handling web services located in mobile terminals. Such situations are often rather complex, in particular since there may be more than one web service at each mobile node and more than one end user that wishes to purchase the same web service, and there is a considerable need for appropriate mechanisms for handling web services in mobile peer-to-peer systems.

SUMMARY

A general object of the present invention is to provide an improved method for handling web services. A more specific object is to achieve an improved registration mechanism for web service peer-to-peer communications. Another object is to enable user-friendly discovery of web service servers located at mobile devices.

These objects are achieved in accordance with the attached claims.

Briefly, the method of the present invention uses well-known mobile node identifiers from the circuit-switched environment to achieve straightforward and user-friendly handling of web services over peer-to-peer connections in packet-switched networks. The proposed registration procedure forms a new unique identifier by combining a web service identifier, such as a Uniform Resource Identifier (URI), with a unique circuit-switched identifier, preferably the phone number/E.164 number, of the mobile node. This combined identifier is used for registering the web service and makes it possible for a web service client part to easily and conveniently find the web service. The unique identifier is preferably registered at a registration unit together with location information comprising the current IP address of the mobile node hosting the web service and the port number for the web service at this mobile node or, alternatively, the name or address of an intermediate device used to reach the web service.

By means of the present invention dynamic IP servers can be contacted in the same way as communication is initiated in circuit switched networks and the web service server function in the mobile node is reached directly through the identifier thereof. This allows for straightforward and user-friendly web service registration and discovery in peer-to-peer communications.

In accordance with other aspects of the invention a registration unit, a mobile node and a communication system with means for handling web services are provided.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
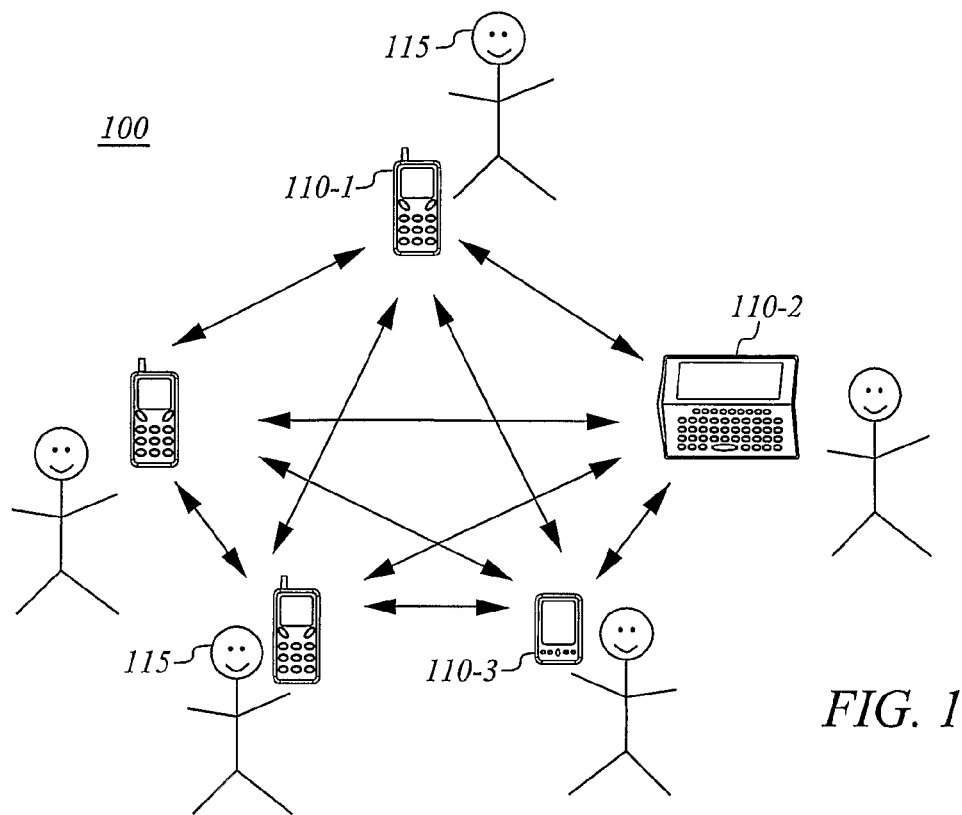
FIG. 1 is a schematic overview of an exemplary network for mobile peer-to-peer communication in which the present invention can be used.

FIG. 1 is a schematic overview of an exemplary network for peer-to-peer communication in which the present invention can be used. A peer-to-peer network includes a number of peers, i.e. users, applications, devices, or groups of users/applications/devices operating as a single entity, which communicate directly with and share resources between each other. The peers do not have to be assigned specific roles like in classic client/server communications, but can often act both as clients and servers depending on the situation.

For the purpose of this disclosure a mobile peer-to-peer communication network will refer to a packet-switched network comprising at least two mobile nodes (also referred to as mobile terminals, user devices, wireless units, etc) capable of requesting and providing services to each other. The peer-to-peer communication occurs directly or via at least one intermediate device, such as a proxy server.

The mobile peer-to-peer network 100 of FIG. 1 includes five users 115 with respective mobile nodes 110, exemplified as cellular phones 110-1, a laptop 110-2 and a pager 110-3. The mobile nodes can communicate with each other through peer-to-peer connections, but are typically also provided with means for accessing the Internet and other IP-based networks. Some or all mobile nodes host web services (servers) that can be accessed by other mobile nodes in the network.

Figure 2:
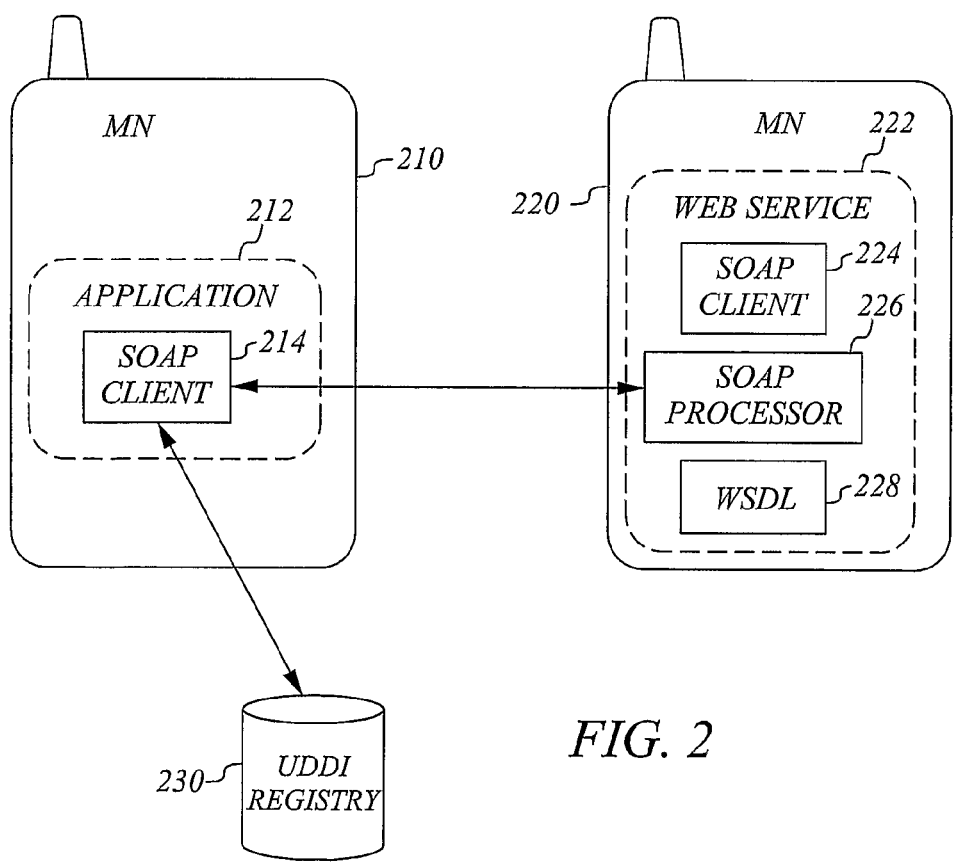
FIG. 2 is a schematic block diagram illustrating mobile-to-mobile web service communication.

FIG. 2 is a schematic block diagram illustrating mobile-to-mobile web service communication. Two mobile nodes 210, 220 are shown, one 210 accessing a web service 222 in the other 220 through an application 212. The web service 222 is implemented with standard web service technologies through a client 224 and a processor 226 based on the Simple Object Access Protocol (SOAP), which is built on the Extensible Markup Language (XML) and typically carried by the Hypertext Transfer Protocol (HTTP). The web service 222 is associated with a description comprising a Web Service Definition Language (WSDL) file 228 with information about how to invoke the service.

Information about the web service 222 is in the illustrated example held at a Universal Description, Discovery and Integration (UDDI) registry 230, where it is published together with a number of other services. The published web service information can for instance include a service identity and the address (e.g. the Uniform Resource Locator, URL) of the service provider. The web service information in the UDDI related to the web service 222 is linked to the WSDL file 228 and can be used by application 212 (with SOAP client 214) to find the web service.

In FIG. 2, the messages are thus exchanged through SOAP but any appropriate web service protocol or other can be used for packaging messages within the scope of the invention, including other XML-based protocols.

Figure 3:
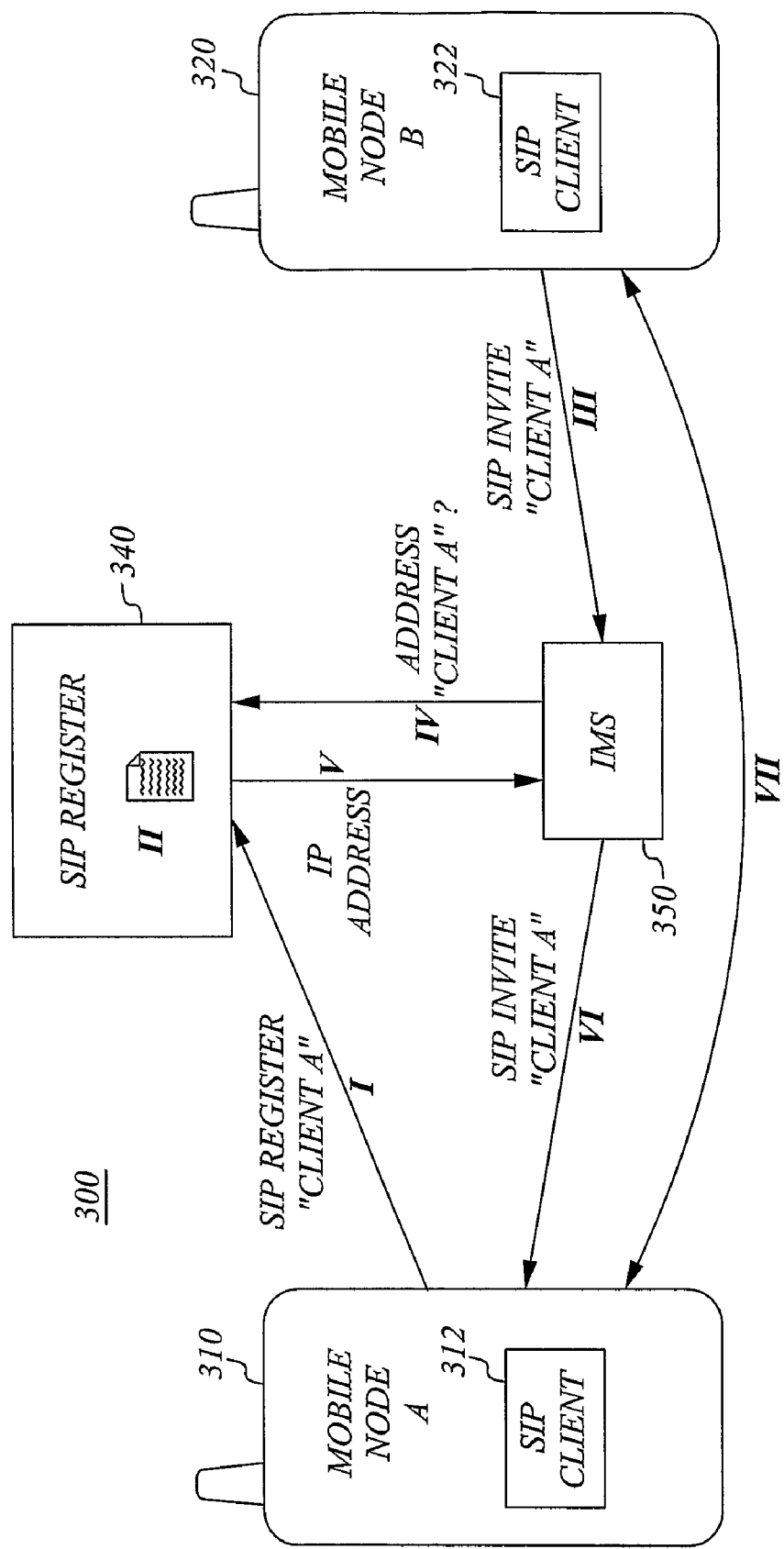
FIG. 3 is a schematic block diagram illustrating conventional SIP registration.

FIG. 3 is a schematic block diagram illustrating the principles of conventional registration for mobile-to-mobile communication. As mentioned in the background section, peer-to-peer connections are normally achieved through an overlay network, such as IMS. IMS uses SIP for session control including registration of mobile devices for peer-to-peer communications.

In the conventional IMS/SIP environment, it is the SIP client of the mobile node that is registered. Registration is often required every time a new Packet Data Protocol (PDP) Context is activated, since many networks use dynamic IP addresses. The SIP client takes care of all received SIP messages to the mobile device and correlates the request to initiate a connection to another peer. The name/identity of the SIP client is provided by the "IMS operator", which guarantees its uniqueness.

With reference to the system 300 of FIG. 3, the registration procedure may be as follows.

(I) A user must register to the IMS before he can receive an invitation to any sessions. A request for registration of the name/identity of SIP client 312 of mobile node A 310 is hereby transmitted to a SIP register server 340, also referred to as a SIP registrar. The SIP client identity can e.g. be a URI or a Tel-URI but is for simplicity just denoted "client A" in FIG. 3.

(II) The SIP register 340 registers the IP address where the mobile node A and thus "client A" can be located. The IP address is dynamic in the sense that it will be reassigned for each registration procedure. (Normally, both mobile nodes register their availability and their IP addresses upon powering up.)

(III) Mobile node B 320 with SIP client 322 wants to initiate a connection with mobile node A 310 and sends an invitation message for "client A" to the IMS unit 350, a SIP proxy used to find the current address of "client A".

(IV,V) The IMS 350 asks for and retrieves the IP address for "client A" from the SIP register 340.

(VI) The invitation message from mobile node B 320 is forwarded to mobile node A 310.

(VII) Mobile-to-mobile communication can take place provided that mobile node A 310 accepts the invitation. (Normally, the response from mobile node A is also relayed through the IMS unit and thereafter the point-to-point communication is established.)

The described prior-art registration procedure is capable of handling a number of IP services and mobile-to-mobile communication sessions. However, when it comes to web services located in mobile terminals, it is associated with severe limitations. Firstly, there may often be situations with more than one web service at the respective mobile nodes. With the conventional registration solutions there would then be a need for some kind of coordinating means inside the mobile device that coordinates all web services requests. We call this the WS-coordination-problem. Secondly, the complexity of the situation is further increased due to the fact that many end users may wish to purchase/download the same web service. This is referred to as the WS-plurality-problem. Thirdly, other mobile nodes generally have to be provided with precise information from a particular mobile node with a web service in order to find the web service at that particular mobile node. Mechanisms that make it easy to find a web service at a particular mobile node are lacking. This is denoted the WS-easy-discovery-problem.

The present invention is based on the recognition of the above problems and the defining of a number of criteria for a well-functioning registration process in web service peer-to-peer environments. These criteria will now be explained.

The first criterion addresses the WS-coordination-problem. In conventional registration, the SIP-client of the mobile terminal is registered. However, for web services it is desirable to instead register each mobile web service separately. Then, there is no need to have something inside the mobile device that coordinates all web services requests even when several servers run on the same mobile phone. The mobile phone will be perceived as an "ordinary" web server and all services can be accessed through different addresses.

Moreover, the registration procedure needs to be such that not only the first user will succeed to register a particular web service. The second criterion is therefore that if you register a service, it should be a unique name so that every mobile device that has purchased/downloaded the web service is able to register it. If this second criterion is fulfilled, the WS-plurality-problem is solved.

Finally, the registered information needs to be unique in such way that the client side of the web service (at mobile node B) is able to find the right server side that is running in the other mobile node (A). This could for example be solved by letting either subscriber A or the register server generate a unique name when registration takes place. The problem is that the name has to be known to subscriber B, otherwise subscriber B will not be able to find the web service of subscriber A. To solve the WS-easy-discovery-problem the criteria are that the registered information should be unique for mobile node A and easy to find for mobile node B.

One solution to the WS-easy-discovery-problem could be that subscriber A sends a message with the generated unique name to subscriber B. However, this would not be very user friendly and in situations where the web services that subscriber A registers can be used by several "B-subscribers", subscriber A would have to send messages to all of these which is rather unfeasible. A more convenient and reliable solution is needed.

The main idea of the invention is to use the fact that there are wide-spread and commonly used identifiers in circuit-switched networks that are already established and well-known to the subscribers. The proposed mechanism uses such circuit-switched identifiers, generally well-known to the end users, for achieving straightforward and user-friendly web service peer-to-peer communication in packet-switched networks.

The registration procedure in accordance with the present invention combines a web service identifier with a unique circuit-switched identifier of the mobile node, in order to form a new unique identifier such that the above criteria are met. A preferred embodiment uses the well-known E.164 number of the mobile phone together with the name, e.g. the URI, of the web service. As will be further explained in the following, this new and unique name identity can be used in registration of the web service and makes it possible for a web services client part to easily and conveniently find the web service.

Figure 4:
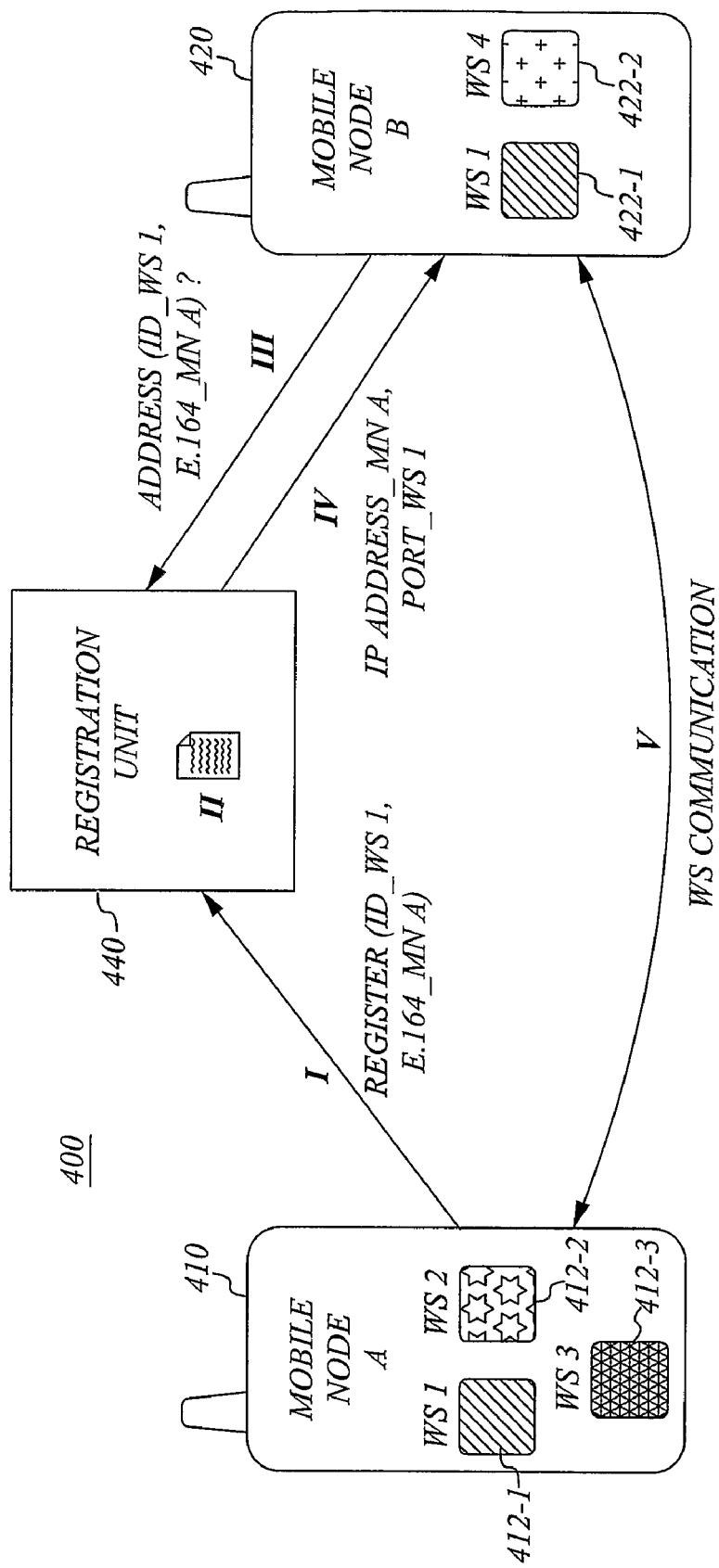
FIG. 4 is a schematic block diagram illustrating an examplary embodiment of a mechanism for web service handling according to the present invention.

Features of the present invention will now be described by way of example with reference to FIG. 4, in which a packet-switched communication system 400 is shown. A situation where a first mobile node A 410 registers a chess game web service (WS 1) 412-1 and another mobile node B 420 then wishes to access the web service 412-1 at mobile node A is used to illustrate the principles of the invention. A prerequisite is that the chess game web service 412-1, 422-1 is downloaded to the mobile devices 410, 420 together with a general name/identity e.g. URI of the web service, such as chessGame@registerSite.com. As illustrated in FIG. 4, the mobile nodes may (but do not have to) comprise other web services 412-2, 412-3 and 422-2, resp., in addition to the chess game. The crucial thing is that the chess game has been downloaded to (or preinstalled in) both the devices.

Registration of the Web Service

A user (subscriber A) decides, after PDP Context activation, that he would like to register a chess game (i.e. the server part thereof) to be able to play chess. He activates the registration part. The registration name to be used for the web service 412-1 is the E.164 number of mobile node A 410 plus the identity (ID) of WS 1 that was included in the downloaded web service game packet. The E.164 number may be input to mobile node A by the user or retrieved from a storage unit or a Subscriber Identity Module (SIM) card in mobile node A. A request for registration is transmitted to a registration server/unit 440 (I). The request can for example be Register web service +46702646318_chessGame@registerSite.com. Mobile node A knows where to send the registration request either through a predefined/default address to be used for such messages or through a URI or the like provided together with the web service.

The registration unit 440, in this example at the domain "registerSite.com", handles the registration of the web service. It registers the unique web service information comprising the identity of the web service and the circuit-switched telephone number of mobile node A together with locating information, such as the IP-address of mobile node A and the port number of WS 1 at mobile node A (II). In this way the web service server part of the game is registered such that both the web service and the mobile node is uniquely defined, whereby the server function of WS 1 412-1 at mobile node A 410 can be located by the client function of WS 1 at other mobile nodes.

Finding the Web Service

Another user, subscriber B, knows (via voice, SMS, MMS, etc.) that subscriber A has a chess game activated on his phone and wants to start a game. (Alternatively, he does not possess this knowledge but wishes to start a game provided that the chess game is activated on mobile node A.)

Subscriber B activates the chess game 422-1 and inputs that he would like to play against subscriber A identified through the E.164 number. The E.164 number can for example be retrieved from a phonebook (not shown) of mobile node B 420. An address resolution requests is then sent from (the chess game of) mobile node B towards the registration unit 440, for example What address to use for +46702646318_chessGame@registerSite.com"? (III). In response, the registration unit returns the current IP-address of mobile node A plus the port number to use for the chess game web service 412-1 (IV). The chess game client 422-1 connects to the IP-address (plus port number) and sends the web service request, i.e. makes a chess move. The web service communication, in this case is the chess game, between mobile node A and B can thereafter be performed directly between the devices (V).

It should be mentioned that a mobile node according to the invention typically is provided with capabilities for acting both as mobile node A and as mobile node B of FIG. 4. In other words, the mobile node is capable of registering a web service server function as well as of accessing a web service server function at another mobile node.

A major advantage of the present invention is that the web service server function in a mobile node can be reached directly through the identifier thereof. This means that SIP clients or other coordinators do not have to be involved in directing the web service request to the right web service in the mobile device.

Another advantage relies in the fact that the proposed solution allows the end-user to use a well-known identifier from circuit-switched communications for reaching web services in packet-switched communication network. Mobile node B can reach mobile node A in a way that closely resembles a circuit-switched telephone call. In other words, dynamic IP servers can be contacted in the same way as connections are made in circuit-switched communications. This is very advantageous since it allows for comparatively simple web service registration mechanisms and for a straightforward and user-friendly web service discovery in peer-to-peer communications. In particular, with the present invention there is no need for generating entirely new identifiers that would increase the complexity of the registration mechanism. Moreover, when using a well-known identifier, such as the E.164 number, for the web service registration the unique identification information normally does not have to be communicated between mobile nodes.

Thus, the proposed solution makes it easy to utilize web services over peer-to-peer connections, which in turn will contribute to making applications with web services in mobile nodes more widely spread.

Figure 5:
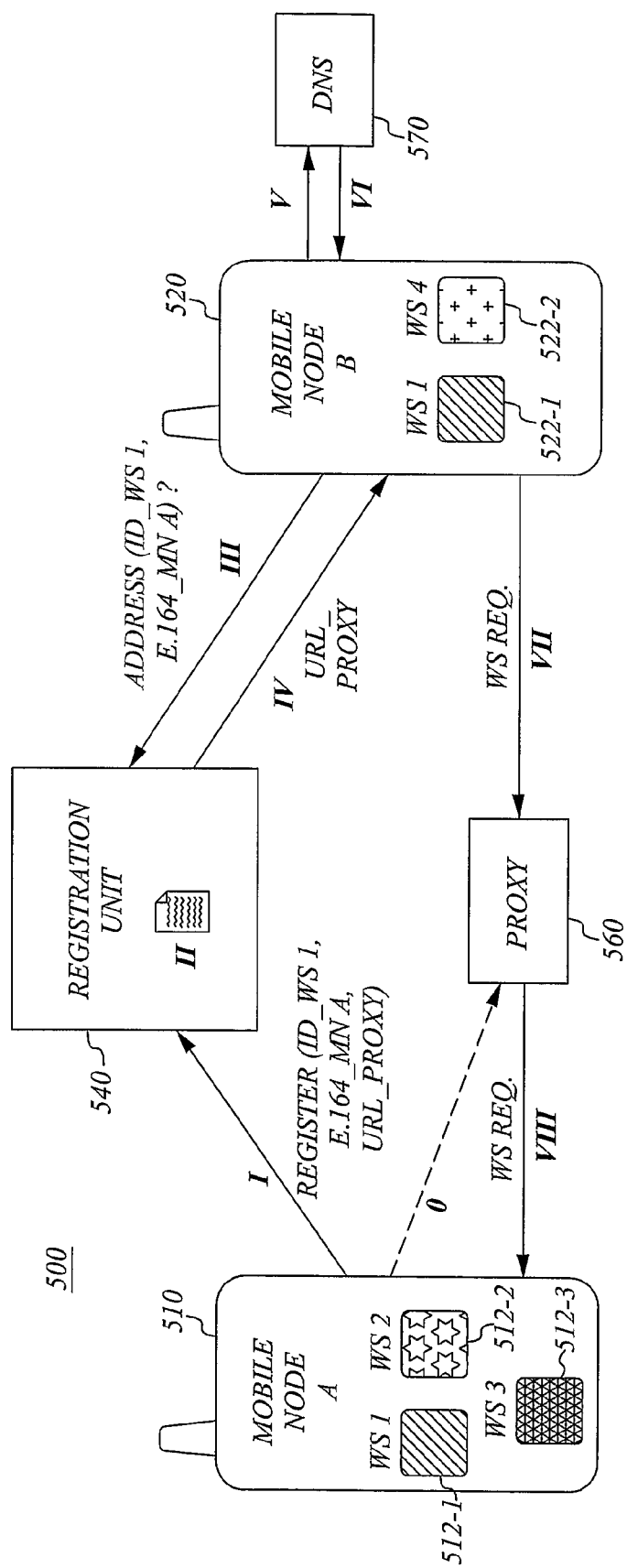
FIG. 5 is a schematic block diagram illustrating another examplary embodiment of a mechanism for web service handling according to the present invention.

FIG. 5 is a schematic block diagram of another examplary embodiment of a mechanism for web service handling according to the invention. In this case, the packet-switched network 500 comprises an intermediate device 560 (also referred to as proxy server), which is used when sending messages to mobile node A 510. A presumption for such a mechanism is that the proxy 560 knows the IP address of mobile node A 510. This address is preferably provided from mobile node A to the proxy in an initial registration of mobile node A towards the proxy (O).

As before, a registration request is sent from mobile node A 510 to the registration unit 540 (I). However, besides the unique identification information mobile node A preferably also communicates a proxy identifier/name, such as a URL, to the registration unit. The location information registered by the registration unit 540 comprises information about of the proxy 560 that is handling messages to (and from) mobile node A 510 instead of the address of the mobile node itself (II). Thus, upon requesting the address of the web service 512-1 (III), mobile node B 520 receives the URL of the proxy 560 (IV). Mobile node B 520 performs a lookup in a Domain Name System (DNS) register 570 to find the IP address that matches the received URL (V, VI). Thereafter, the chess game client 522-1 can send the web service request, i.e. the chess move, to the web service function 512-1 in mobile node A via the proxy 560 (VII, VIII). The subsequent web service communication between mobile node A and B is normally performed via the proxy.

An alternative to the optional registration of mobile node A towards the proxy (O) could be to send the IP address of mobile node A together with the registration request (I). Then, it can for example be transferred to the proxy via mobile node B (IV, VII) or directly upon request.

In FIG. 5, a name/identifier of the proxy is registered and the IP address has to be retrieved from a DNS register or the like. There may also be embodiments (not shown) where the IP address of the proxy is provided in the registered location information instead of or in addition to the proxy name/ID. In such cases, the DNS lookup will not be needed.

In the examples of FIGS. 4 and 5, the unique identification information registered by the registration unit comprises the URI of the web service and the E.164 number of mobile node A. The E.164 number may in some embodiments be replaced with another unique mobile node identifier from the circuit-switched environment, such as an International Mobile System Identifier (IMSI) or an International Mobile Equipment Identity (IMEI). Combinations of circuit-switched identifiers can also be used. It is however preferred to use an identifier that is well-known or easily accessed/retrieved by most subscribers and the phone number is therefore generally the most appropriate choice. Furthermore, there may be embodiments which use other web service identifiers than the URI.

The web service identifier and the unique circuit-switched identifier of the first mobile node can with advantage be concatenated into a combined service and node specific identifier to be used in the registration procedure. The concatenating can be performed at mobile node A or, alternatively, at the registration unit. Such combined identifiers can for example be in the form of E.164_URL, e.g. +467026646318_chessGame@registerSite.com. Another possibility is to define the combined identifier as chessGame.+467026646318@registerSite.com. It will be evident to a person skilled in the art that several equivalent syntaxes (with differently arranged elements, other separators, etc) can be used.

The web service is generally downloaded from the network to the mobile nodes but the invention is also applicable to web services that are preinstalled in the mobile node. Furthermore, it should be noted that the proposed web service registration is applicable not only to web services implemented through standard web service technologies, such as the web service of FIG. 2, but also to cases where a "normal" web server located at the first mobile node is registered. Such a web server can for example be accessed by mobile node B by means of a conventional browser function. Thus, web service refers to services/servers based on conventional www-technologies as well as services/servers based on web service technologies like SOAP.

The unique identification information registered by the registration unit/server would typically be stored in the registration unit. However, solutions where this information is held at an external storage unit/database or is distributed throughout the network also lie within the scope of the invention. The registration unit in accordance with the present invention can with advantage be implemented together with or based on a Session Initiation Protocol (SIP) registrar server. Other solutions are also possible, including solutions using a UDDI registry.

Figure 6:
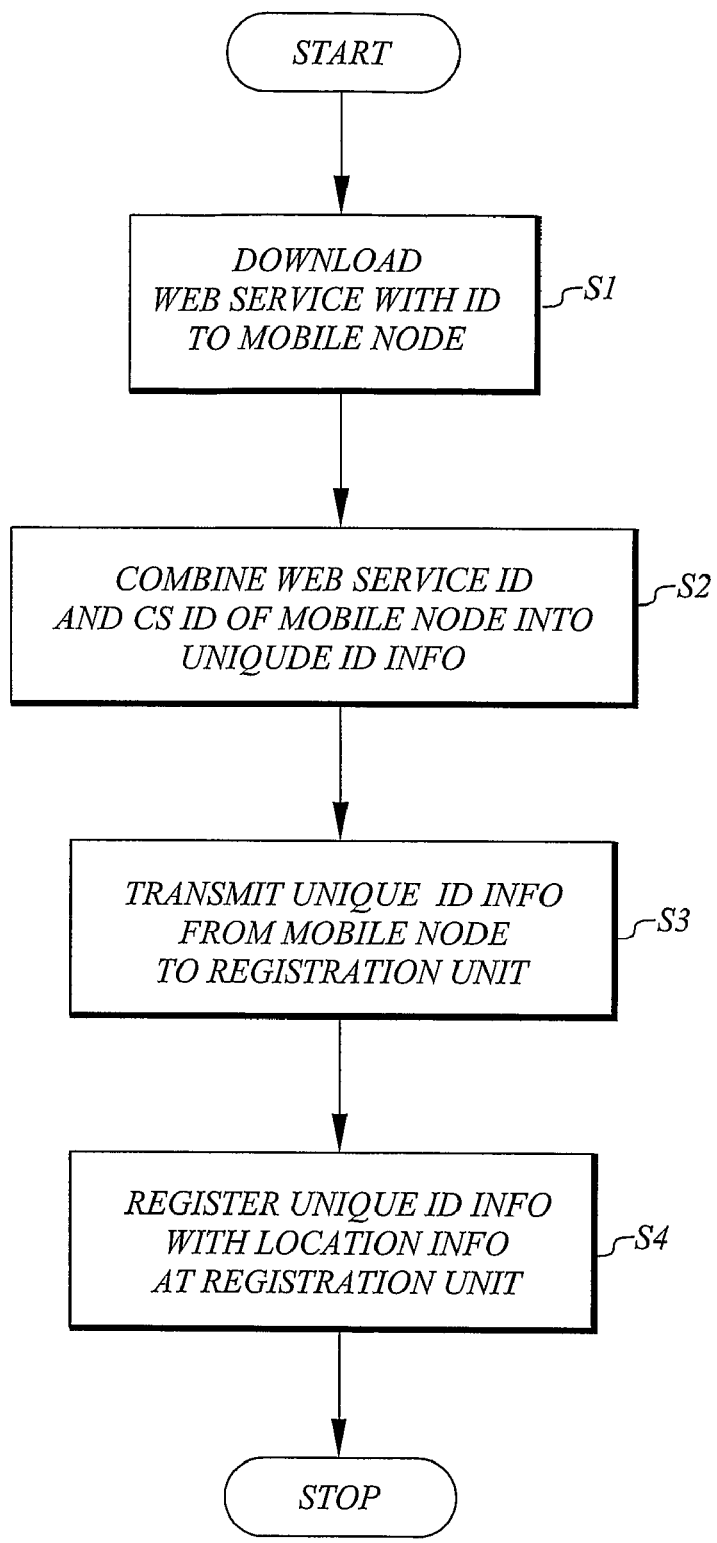
FIG. 6 is a flow chart of an exemplary embodiment of a method for handling web services according to the present invention.

FIG. 6 is a flow chart summarizing the principles of a method for handling web services according to the invention. In an optional first step S1, a web service associated with a web service identity, such as a URI, is downloaded to a first mobile node. Alternatively, the web service may be preinstalled in the mobile device. (The web service/server can be based on web service technologies and/or on general www-technologies.) Thereafter, unique identification information is formed in step S2, preferably through combining the web service identity with an identifier of the mobile node that is common in circuit-switched communications. In a preferred embodiment this involves concatenating the web service URL and the E.164 number/phone number of the mobile node. The new unique identification information is transmitted from the mobile node to a registration unit in step S3, where it is registered together with location information that makes it possible for other mobile nodes to find the web service at the first mobile node and communicate directly with it (step S4). The location information may for example comprise the current IP address of the first mobile node and the port number for the web service at this mobile node. In other embodiments the location information relates to an intermediate device that can be used to reach the web service at the first mobile node.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

The invention claimed is:

1. A method of handling a web service in a packet-switched communication system in which a first mobile node and a second mobile node store the web service and the first and second mobile nodes communicate with each other to utilize the service, the method comprising the steps of:

receiving by a registration unit separate from the first and second mobile nodes, a request from the first mobile node to register the web service of the first mobile node at the registration unit, the request including a web service identifier associated with the web service and a unique circuit-switched identifier of the first mobile node;

registering, at the registration unit, the web service identifier associated with the web service, the unique circuit-switched identifier of the first mobile node, and locating information for the web service at the first mobile node;

receiving at the registration unit, a request from the second mobile node requesting the locating information for the web service at the first mobile node, wherein the request from the second mobile node includes the web service identifier associated with the web service and the unique circuit-switched identifier of the first mobile node; and transferring the requested locating information from the registration unit to the second mobile node to enable the second mobile node to communicate with the web service at the first mobile node.

2. The method of claim 1, wherein the unique circuit-switched identifier comprises a telephone or E.164 number of the first mobile node.

3. The method of claim 1, further comprising the step of establishing, at the second mobile node, communication with the web service of the first mobile node using the locating information.

4. The method of claim 1, further comprising the step of concatenating, at the first mobile node, the web service identifier and the unique circuit-switched identifier of the first mobile node into a combined service and node specific identifier to be used in the transmitting step sent to the registration unit.

5. The method of claim 1, further comprising the step of concatenating, at the registration unit, the web service identifier and the unique circuit-switched identifier of the first mobile node into a combined service and node specific identifier to be used in the registering step.

6. The method of claim 1, wherein the locating information comprises a current IP address of the first mobile node and a port number of the web service at the first mobile node.

7. The method of claim 1, wherein the locating information comprises an identifier of an intermediate device used for reaching the first mobile node.

8. The method of claim 1, wherein the locating information comprises an IP address of an intermediate device used for reaching the first mobile node.

9. The method of claim 1, wherein the web service identifier comprises a Uniform Resource Identifier (URI).

10. A registration server in a packet-switched communication system for handling a web service, wherein a first mobile node and a second mobile node store the web service and the first and second mobile nodes communicate with each other to utilize the service, the registration server comprising:

a processor and a non-transitory memory device for storing computer program instructions, wherein when the processor executes the instructions, the processor causes the registration server to perform the following steps:

receiving, from the first mobile node, a request to register the web service of the first mobile node at the registration unit, the request including a web service identifier associated with the web service and a unique circuit-switched identifier of the first mobile node;

registering the web service identifier associated with the web service, the unique circuit-switched identifier of the first mobile node, and locating information for the web service at the first mobile node;

receiving, from the second mobile node, an address request for the web service at the first mobile node, wherein the address request includes the web service identifier associated with the web service and the unique circuit-switched identifier of the first mobile node; and transferring the locating information for the web service at the first mobile node to the second mobile node in response to the address request.

11. The registration server of claim 10, wherein the unique circuit-switched identifier comprises a telephone or E.164 number of the first mobile node.

12. The registration server of claim 10, wherein the server is adapted to concatenate the web service identifier and the unique circuit-switched identifier of the first mobile node into a combined service and node specific identifier.

13. The registration server of claim 10, wherein the locating information comprises a current IP address of the first mobile node and a port number of the web service at the first mobile node.

14. The registration server of claim 10, wherein the locating information comprises an identifier of an intermediate device used for reaching the first mobile node.

15. The registration server of claim 10, wherein the locating information comprises an IP address of an intermediate device used for reaching the first mobile node.

16. The registration server of claim 10, comprising a Session Initiation Protocol (SIP) registrar server.

17. A first mobile node in a packet-switched communication system having a registration unit for handling a web service, the first mobile node storing a web service associated with a web service identifier and comprising:

a processor and a non-transitory memory device for storing computer program instructions, wherein when the processor executes the instructions, the processor causes the first mobile node to perform the following steps:

transmitting, to the registration unit, a request to register the web service, the request including the web service identifier associated with the web service and a unique circuit-switched identifier of the first mobile node, the registration unit registering the web service identifier associated with the web service, the unique circuit-switched identifier of the first mobile node, and locating information for the web service at the first mobile node, wherein when a second mobile node requests the locating information from the registration unit utilizing the web service identifier and the unique circuit-switched identifier of the first mobile node, the registration unit transfers the locating information to the second mobile node, enabling the second mobile node to locate the web service at the first mobile node;

receiving a request from the second mobile node to establish communications with the web service at the first mobile node; and establishing communications between the second mobile node and the web service at the first mobile node in response to the request from the second mobile node.

18. The first mobile node of claim 17, wherein the unique circuit-switched identifier comprises a telephone or E.164 number of the mobile node.

19. The first mobile node of claim 17, wherein the first mobile node is adapted to concatenate the web service identifier and the unique circuit-switched identifier of the first mobile node into a combined service and node specific identifier.

20. The first mobile node of claim 17, wherein the first mobile node is adapted to:

request locating information for a web service at the second mobile node from the registration unit, the web service at the second mobile node being specified through unique identification information registered at the registration unit by the second mobile node; and establish communication with the web service of the second mobile node using the requested locating information.

21. The first mobile node of claim 20, wherein the locating information for the web service at the second mobile node comprises a current IP address of the second mobile node and a port number of the web service at the second mobile node.

22. The first mobile node of claim 20, wherein the locating information for the web service at the second mobile node comprises an identifier of an intermediate device used for reaching the second mobile node.

23. The first mobile node of claim 20, wherein the locating information for the web service at the second mobile node comprises an IP address of an intermediate device used for reaching the second mobile node.

24. A packet-switched communication system that handles web services, the system comprising:
 a first mobile node; and
 a registration unit in communication with the first mobile node and a second mobile node;
 wherein the first mobile node is adapted to store a web service associated with a web service identifier, and to transmit to the registration unit, a request for registering the web service of the first mobile node, the request including the web service identifier associated with the web service and a unique circuit-switched identifier of the first mobile node; and
 wherein the registration unit is adapted to:
 register the web service identifier associated with the web service, the unique circuit-switched identifier of the first mobile node, and locating information for the web service at the first mobile node;
 receive a request from the second mobile requesting the location information for the web service at the first mobile node, wherein the request from the second mobile node includes the web service identifier associated with the web service and the unique circuit-switched identifier of the first mobile node; and
 transfer the requested location information form the registration unit to the second mobile node to enable the second mobile node to communicate with the web service at the first mobile node.

25. The system of claim 24, wherein the unique circuit-switched identifier comprises a telephone or E.164 number of the first mobile node.

* * * * *